United States Patent
Heilmann et al.

(10) Patent No.: US 6,957,799 B2
(45) Date of Patent: Oct. 25, 2005

(54) VALVE FOR A NON-REFILLABLE PRESSURIZED CONTAINER

(75) Inventors: Albert Heilmann, Warwick, RI (US); Scott Piette, Cumberland, RI (US)

(73) Assignee: Amtrol, Inc., West Warwick, RI (US)

( * ) Notice: Subject to any disclaimer, the term of this patent is extended or adjusted under 35 U.S.C. 154(b) by 0 days.

(21) Appl. No.: 10/716,638

(22) Filed: Nov. 18, 2003

(65) Prior Publication Data

US 2004/0188649 A1 Sep. 30, 2004

Related U.S. Application Data

(60) Provisional application No. 60/457,452, filed on Mar. 25, 2003.

(51) Int. Cl.[7] ............................................. F16K 51/00
(52) U.S. Cl. ................. 251/82; 137/614.11; 137/614.2; 251/218
(58) Field of Search ........................... 251/82, 218, 215; 222/147; 137/614.2, 614.11

(56) References Cited

U.S. PATENT DOCUMENTS

| | | | | |
|---|---|---|---|---|
| 3,589,397 A | * | 6/1971 | Wagner | 137/614.2 |
| 3,704,813 A | * | 12/1972 | Devol | 222/147 |
| 3,985,332 A | | 10/1976 | Walker | |
| 4,543,980 A | | 10/1985 | van der Sanden | |
| 4,573,611 A | * | 3/1986 | O'Connor | 222/147 |
| 5,036,876 A | * | 8/1991 | Jernberg | 251/82 |
| 5,050,633 A | * | 9/1991 | Tarnay et al. | 251/218 |
| 5,295,502 A | * | 3/1994 | Lane | 222/147 |
| 5,657,790 A | * | 8/1997 | Mohn | 137/614.2 |
| 5,794,660 A | * | 8/1998 | Mohn | 137/614.2 |
| 5,992,440 A | * | 11/1999 | Betz | 251/218 |
| 6,595,486 B2 | * | 7/2003 | Chen | 251/82 |

* cited by examiner

*Primary Examiner*—John Bastianelli
(74) *Attorney, Agent, or Firm*—George W. Neuner; Edwards & Angell LLP

(57) ABSTRACT

A valve for a pressurized container includes a valve housing having a central bore and a port in the for connection of a nozzle. Preferably, the valve has a unidirectional stepped valve housing. In the housing is a central bore that includes an upper portion, lower portion and a middle portion. The lower portion is narrower than the middle portion which in turn is narrower than the upper portion. The port is provided in the middle portion of said housing to facilitate connection of a nozzle to the valve. The valve has a t-stem with a lower end having a key-way and a cavity for receiving the upper portion of the valve seat. The valve seat provides the primary valve seal when the valve is closed. The upper portion of the valve seat has a geometry for engaging the t-stem to provide a locked assembly.

20 Claims, 8 Drawing Sheets

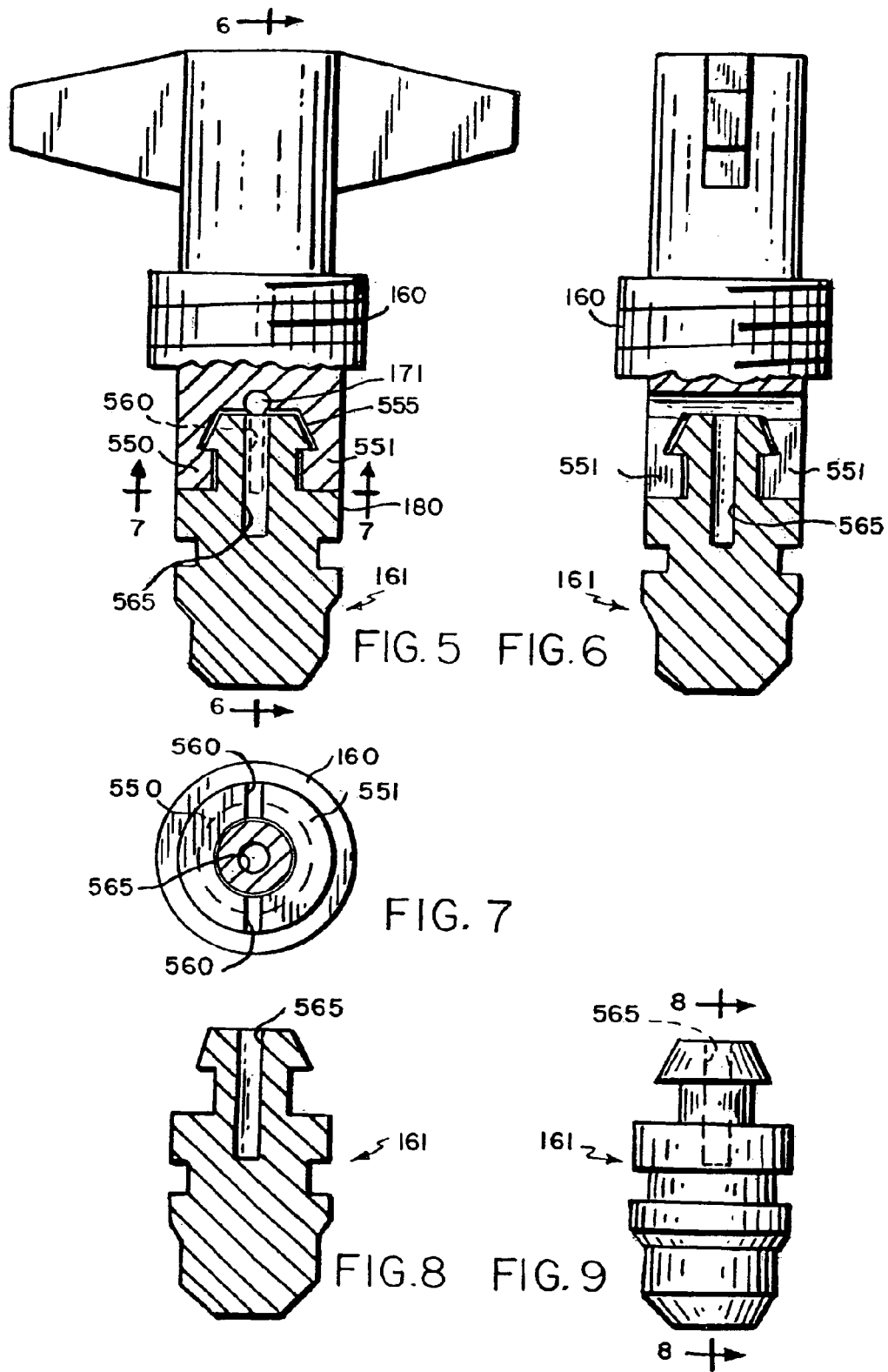

VALVE FOR A NON-REFILLABLE PRESSURIZED CONTAINER

This application claims the benefit of provisional application No. 60/457,452, filed Mar. 25, 2003.

BACKGROUND OF THE INVENTION

1. Field of the Invention

The invention generally relates to valves for pressurized tanks or other pressurized containers, e.g., pressurized gas bottles. More particularly, the invention relates to valves for pressurized containers which are commercially characterized as being "non-refillable" or "no-return" containers and which, for reasons of safety and otherwise, are not intended for re-use after their initial contents have been emptied. Valves for such containers are also often referred to in the art as "single use" valves for pressurized containers.

2. Description of the Related Art

Pressure tanks or other pressure containers are usually filled under carefully controlled conditions at a charging station and then distributed to other places for use. When empty it is intended that the containers be returned to the charging center for appropriate reuse or destruction in the case of single use containers. Unfortunately, the attractive economies of refilling containers at points of use or otherwise repressurizing them under less than carefully supervised conditions has resulted in the introduction of impurities or inferior refills and, more seriously, in injurious explosions. The reuse of pressure containers is highly objectionable for many reasons which relate to safety.

So-called "non-refillable valves" are well known in the prior art. Specific examples of known valves include valves of the type described in U.S. Pat. No. 4,543,980, to van der Sanden, issued Oct. 1, 1985; valves of the type described in U.S. Pat. No. 4,573,611, to O'Connor, issued Mar. 4, 1986, and the various prior art valves described in the aforementioned patents. Both the van der Sanden and O'Connor patents mentioned above are incorporated herein by reference.

In the van der Sanden patent, reference is made to techniques in which one-way ball valves can be used in conjunction with pressurized containers so as to allow for them to be initially charged through an orifice, and wherein further charging is prevented once the initial charge has been completed. The prevention of further charging is performed by forcing a ball past a constriction into a final location in a manner such that it cannot return above the restriction. Once the ball is in this final location, it will block any further refilling by simply seating in the q1valve. However, as noted by van der Sanden, the use of a ball valve is somewhat intricate and complex and requires careful precision machining.

Walker in U.S. Pat. No. 3,985,332 discloses a non-refillable safety valve for a pressurized container. The valve includes a housing having a central bore, a hollow knob unit also having a central bore, and a core having a central bore which is slideably mounted in the central bore of the housing. The hollow knob unit is in threaded engagement with the outer wall of the housing. The central bore of the housing provides communication between a port and the pressurized container for charging and selectively discharging of the pressurized container. A sealing member is provided which is slideably mounted in the lower end portion of the central bore of the core. An outwardly biased spring snaps outwardly into a channel to prevent the knob unit from being completely unscrewed. An element prevents the pressurized vessel from being refilled. This device was characterized by van der Sanden as being complex and expensive to manufacture.

Van der Sanden describes a valve for a pressurized container having a blocking element therein which is adapted to occupy an initial location in which fluid can move in and out of the container past the blocking element. According to van der Sanden, the valve and blocking element are further configured such that the blocking element can be irreversibly moved to a position in which the valve permits the escape of fluid under pressure exerted from inside the container, but which automatically closes in response to exposure to an external pressure greater than the pressure inside the container. The blocking element is formed of at least one radially extending arm whose lateral radius is reduced upon movement of the blocking element from the initial location to the final location. Then, at least one arm expands within the final location to prevent return of the blocking element to the initial location.

The non-refillable valve taught by van der Sanden, although offering manufacturing advantages over the prior art valve designs known at that time, still requires the use of a complex and relatively costly manufacturing process and, also, suffers from certain performance limitations as well.

In particular, the valve housing described by van der Sanden requires the formation of manufactured undercuts or "blinds" in order to function properly. For example, the undercut shown at reference number 37 in van der Sanden FIG. 1 (where the central core of the valve shown in FIG. 1 is wider immediately below location 37 than it is immediately above that location) is a requirement for practicing the referenced invention and adds complexity and expense to the valve housing manufacturing process. Furthermore, the blocking element is "directional", that is, it needs to be carefully inserted in the proper direction during the manufacturing process for the valve to work at all.

In addition, in the valve taught by van der Sanden, the blocking element is held in its initial position (to facilitate initial charging of the container) by a connection of the blocking element to a stem, rod or some other valve component, or the operation of the blocking element is dependent on the proper operation of another movable internal valve component, such as a slideable rod, etc., for its proper positioning. Steps such as these can complicate the valve manufacturing process. Operationally, this requirement can introduces a potential performance limitation affecting valve reliability because blocking element linkage with or dependency on other valve components becomes a factor in achieving valve reliability.

The O'Connor non-refillable valve differs in many respects from the teachings of van der Sanden. For example, the O'Connor valve uses pressure instead of a mechanical force to release the primary valve seal; O'Connor utilizes the same element for making a primary valve seal when closing the valve as is used (i.e., the element doubles as) the blocking element, etc. However, many of the same problems inherent in manufacturing a non-refillable valve are common to both van der Sanden's teachings and those of O'Connor such as, for example, the requirement that the valve housing used have manufactured undercuts, the blocking element used is still "directional", i.e., it needs to be carefully inserted in the proper direction during the manufacturing process for the valve to work.

Non-refillable valves desirably fill the following requirements: (a) the need for a dual purpose manufacturing process that uses a single basic valve design to enable both refillable and non-refillable valves to be manufactured using essentially the same parts list, machine tools, etc.; instead of the present practice of having to execute dedicated manufacturing process for producing refillable versus non-refillable type valves (because of differing housing types that are used, different components required for valve operation, etc.); (b) the need for a valve design (both refillable and non-refillable) that utilizes a mechanically operated primary sealing mechanism (as opposed to valve designs that utilize a pressure differential to open the primary sealing mechanism) to insure seal quality while solving the other problems with known valves indicated hereinabove; (c) the need for a valve design that prevents rotation of the primary sealing mechanism in the valve housing to minimize wear, extend valve life and further improve seal quality; (d) the need for a valve design in which the primary sealing mechanism and means for controlling the opening and closing of the valve are optionally made from discrete components formed from different materials to enable the sealing mechanism to be chemically compatible with the fluid contents of the container even when the controlling mechanism (means for controlling the opening and closing of the valve) is not; and (e) the need for a valve design, solving all of the aforementioned problems and meeting the aforestated needs, which is relatively simple and inexpensive, which will allow normal filling of the pressure container under proper conditions, adequate sealing of the pressure during nonuse, selective discharge of the pressure container and, in the case of the non-refillable valves contemplated by the invention, provide effective protection and prevention against improper and unauthorized filling of the container.

Mohn, U.S. Pat. No. 5,794,660 describes a non-refillable valve for a pressurized container which includes a unidirectional stepped valve housing within which a freestanding blocking element is housed. The blocking element is preferably a reversible, symmetrical check that integrally includes stop means for preventing the return of said blocking element to an initial location after it has been moved to a final location that activates the one way characteristic feature of a non-refillable valve (where activation is designed to take place after initially charging of the container).

De Fu Chen, U.S. Pat. No. 6,595,486 describes a non-refillable valve assembly that includes a valve stem and valve seat that is slidably received in the valve stem. Initially, the valve seat resides in a first position above a rim or protrusion in the valve body. After filling the valve seat is pushed past the rim or protrusion by operation of the valve stem, thus sealing the container and also preventing refilling.

Thus, it can be appreciated that it remains desirable to have new valve designs that provide the needs discussed hereinabove and yet remain relatively simple and inexpensive to produce.

SUMMARY OF THE INVENTION

The present invention provides a valve design that (a) utilizes a mechanically operated primary sealing mechanism to insure seal quality; (b) reduces rotation of the primary sealing mechanism in the valve housing to minimize wear, extend valve life and further improve seal quality; (c) optionally incorporates discrete components made of differing materials for realizing the primary sealing mechanism and means for controlling the opening and closing of the valve, to enable the sealing mechanism to be chemically compatible with the fluid contents of the container even when the controlling mechanism is not; and (d) is relatively simple and inexpensive, which will allow normal filling of the pressure container under proper conditions, adequate sealing of the pressure during nonuse, selective discharge of the pressure container and, in the case of the non-refillable valves contemplated by the invention, provide effective protection and prevention against improper and unauthorized filling of the container.

In accord with the present invention, a valve for a pressurized container comprises a valve housing having a central bore; a port in said housing to facilitate connection of a nozzle thereto; a t-stem having a lower end with a key-way, the lower end further having in conjunction with the key-way a cavity of a predetermined shape; and a valve seat providing the primary valve seal when the valve is closed, wherein the valve seat has an upper portion and a lower portion, the lower portion being structured and arranged to provide the primary valve seal in cooperation with the valve housing, the upper portion having a geometry for engaging with the t-stem to provide a locked assembly; the t-stem and valve seat being located in the housing and cooperating to position the valve seat for the primary valve seal. A non-refillable valve in accord with the present invention further comprises a blocking element in the central bore.

In one embodiment of the invention, a valve for a pressurized container comprises a unidirectional stepped valve housing, wherein said housing comprises a central bore that includes an upper portion, lower portion and a middle portion located therebetween, wherein said lower portion is narrower than said middle portion which in turn is narrower than said upper portion; a port in the middle portion of said housing to facilitate connection of a nozzle thereto; a t-stem having a lower end with a key-way, the lower end further having in conjunction with the key-way a cavity of a predetermined geometric shape; and a valve seat providing the primary valve seal when the valve is closed, wherein the valve seat has an upper portion and a lower portion, the lower portion being structured and arranged to provide the primary valve seal in cooperation with the valve housing, the upper portion having a geometry corresponding to the predetermined geometric shape for engaging with the t-stem to provide a locked assembly; the t-stem and valve seat being located in the housing and cooperating to position the valve seat for the primary valve seal. A non-refillable valve in accord with the present invention further comprises a blocking element in the lower portion of said central bore.

A non-refillable valve for a pressurized container in accord with certain embodiments of the invention preferably includes a blocking element adapted to occupy an initial location, in which fluid can move in and out of the container past the blocking element, where the valve and blocking element are further configured such that the blocking element can be irreversibly moved to a position in which the valve permits escape of fluid under pressure exerted from the inside of the container, but which automatically closes in response to exposure to an external pressure greater than the pressure inside the container.

Furthermore, in preferred embodiments of the invention, the valve comprises a valve seat (also referred to herein as the valve's primary sealing mechanism) that is used in combination with the t-stem as a mechanism for driving the blocking element (check) to the position in which the valve is operative to permit escape of fluid under pressure exerted from the inside of the container; but which automatically closes in response to exposure to an external pressure greater than the pressure inside the container (after initial charging).

In other words, the stem and valve seat combination is used to force the blocking element from its initial position to its final location, after which the one way feature of the valve is activated.

Thus, a preferred non-refillable valve for a pressurized container comprises a blocking element adapted to occupy an initial location whereby fluid can move in and out of the container past the blocking element, the valve and blocking element being further configured such that the blocking element can be irreversibly moved to a final location in which the valve permits escape of fluid under pressure exerted from the inside of the container, but which automatically closes in response to exposure to an external pressure greater than the pressure inside the container, the blocking element comprising a reversible check that integrally includes stop means for preventing the return of the blocking element to the initial location upon movement of the blocking element from the initial location to the final location.

In certain alternative embodiments of the invention, a non-refillable valve is described as including a check characterized as freestanding, preferably, both freestanding and reversible. In the case of a reversible check, more preferably the reversible ends of the check have the same shape.

In certain preferred embodiments of the invention, the non-refillable valves comprise (a) a unidirectional stepped valve housing and (b) the use of an easy to install, reversible, symmetrical check that (once installed) is freestanding. Furthermore, such check preferably integrally incorporates deformable stop means which is automatically operative to prevent the return of the check to an initial location upon movement of the blocking element from the initial location to a final location, with the check being further designed to inherently reduce the risk of false check engagement during the valve assembly process.

A "deformable" member (blocking element, check, stop means, etc.), as used herein, is a member that can change shape under the influence of a predetermined amount of force required to drive the member through an opening; but which is relatively rigid when not under the influence of the predetermined amount of force in order to avoid premature forcing of the member through the opening. Such member preferably possesses a predefined degree of structural integrity that in addition to inhibiting false engagement, tends to prevent pieces of the member from breaking when the member is being driven or otherwise forced through the opening.

Embodiments of the invention also provide a valve design that reduces rotation of the primary sealing mechanism in the valve housing to minimize wear, extend valve life and further improve seal quality; a valve design in which the primary sealing mechanism and means for controlling the opening and closing of the valve are optionally made from discrete components formed from differing materials to enable the sealing mechanism to be chemically compatible with the fluid contents of the container even when the controlling mechanism (means for controlling the opening and closing of the valve) is not; and a valve design that is relatively simple and inexpensive, which will allow normal filling of the pressure container under proper conditions, adequate sealing of the pressure during nonuse, selective discharge of the pressure container and, in the case of the non-refillable valves contemplated by the invention, provide effective protection and prevention against improper and unauthorized filling of the container.

Thus, preferred embodiments of the present invention provides a container with a valve preventing refilling, the valve comprising: a unidirectional stepped valve housing, wherein said housing comprises a central bore that includes an upper portion, lower portion and a middle portion located therebetween, wherein said lower portion is narrower than said middle portion which in turn is narrower than said upper portion; a blocking element in the lower portion of said central bore; a port in the middle portion of said housing to facilitate connection of a nozzle thereto; a t-stem having a lower end with a key-way, the lower end further having in conjunction with the key-way a cavity of a predetermined shape; and a valve seat providing the primary valve seal when the valve is closed, wherein the valve seat has an upper portion and a lower portion, the lower portion being structured and arranged to provide the primary valve seal in cooperation with the valve housing, the upper portion having a geometry for cooperating with the t-stem to provide a locked assembly; the t-stem and valve seat being located in the housing and cooperating to position the valve seat for the primary valve seal.

Accordingly, a preferred single basic valve design can be used for manufacturing both refillable and non-refillable valves using essentially the same parts list, machine tools, etc., wherein the design incorporates a unidirectional stepped valve housing as defined in U.S. Pat. No. 5,794,660.

Preferred embodiments of the invention provide a non-refillable valve design that incorporates a reversible free-standing check as a blocking element, as defined hereinbefore, to simplify the valve design and check installation process. Preferably, the non-refillable valve has a symmetrical reversible check to once again simplify the valve design and check installation process.

The freestanding check minimizes the number of required valve manufacturing assembly steps, enhances valve reliability by minimizing the number of required actions for the valve to work, lowers valve and check manufacturing costs, etc. A blocking element that does not need to be connected to a stem, rod or some other internal valve component; or otherwise depend on the operation of another movable internal valve component, such as a slideable rod, etc., for its proper positioning, is defined herein to be a "freestanding" blocking element (or check).

These and other features of the present invention and the manner of obtaining them will become apparent to those skilled in the art, and the invention itself will be better understood by reference to the following detailed description read in conjunction with the accompanying Drawings.

BRIEF DESCRIPTION OF THE DRAWINGS

FIG. 5 is an elevation view, partially in cross-section, of one embodiment of a t-stem assembly of the non-refillable valve in accord with the present invention.

FIG. 6 is a side view, partially in cross-section, of the t-stem assembly shown in FIG. 5 (i.e., rotated 90 degrees).

FIG. 7 is a view taken at line 7—7 in FIG. 5.

FIG. 8 is an elevation cross-sectional view of the valve seat taken at line 8—8 in FIG. 9.

FIG. 9 is an elevation view of the valve seat shown in FIG. 1 and in FIG. 5.

DETAILED DESCRIPTION OF THE INVENTION AND PREFERRED EMBODIMENT

A non-refillable valve of the type contemplated by one aspect of the invention will first be described with reference to FIGS. 1–4. This is followed by a description of several embodiments of blocking elements contemplated by another aspect of the invention. Exemplary blocking element embodiments are described with reference to FIGS. 10–12. Finally, a description of a manufacturing process is set forth with reference to the exemplary manufacturing process depicted in FIG. 13.

Figure 1:
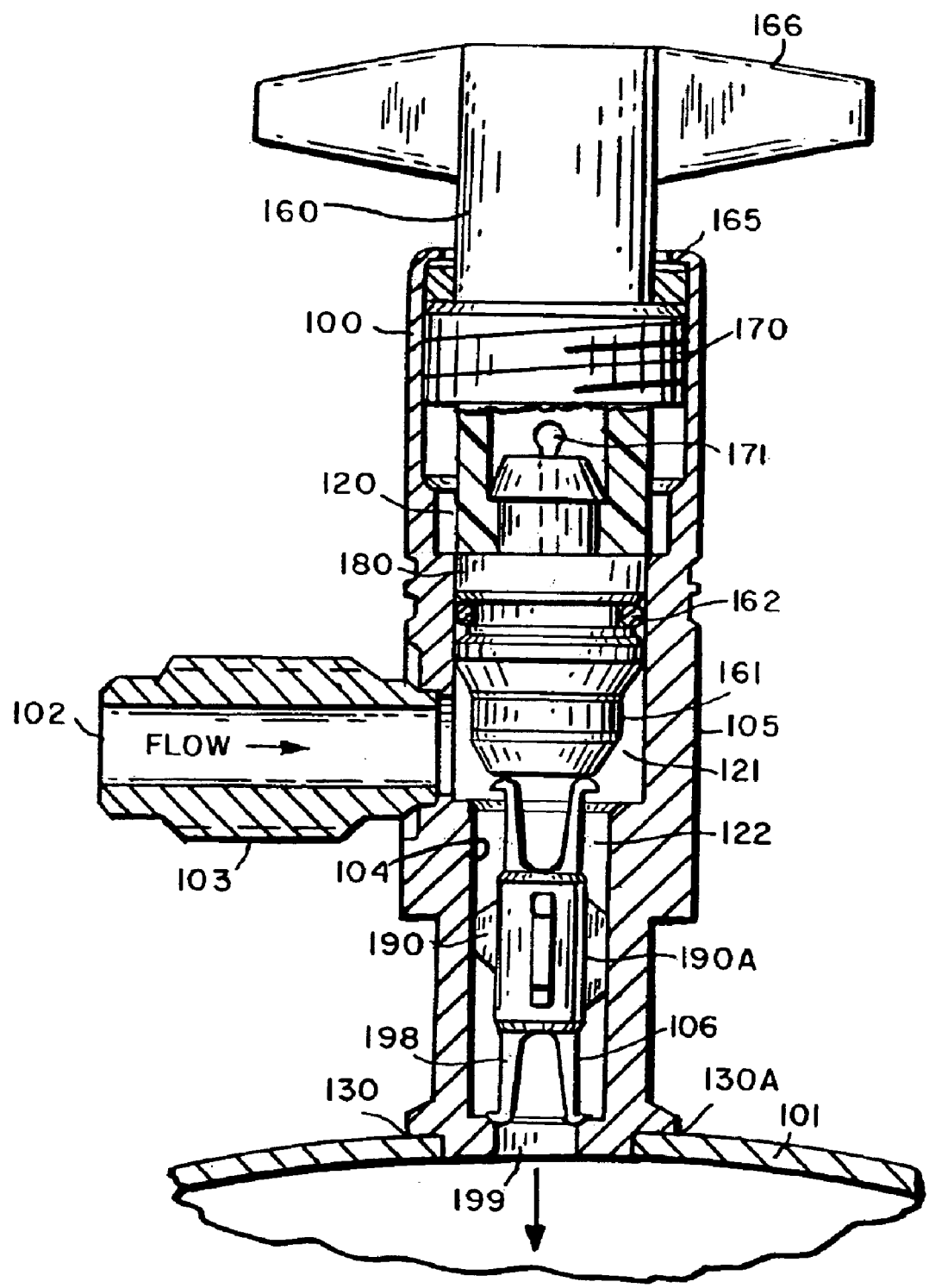
FIG. 1 is an elevation view, partially in cross-section, of a non-refillable valve in accord with one embodiment of the present invention, in its filling position.

As indicated hereinabove, FIG. 1 is a longitudinal cross-sectional view of a non-refillable valve (valve 100), of the type contemplated by a first aspect of the invention, in a "filling position". In the filling position, valve 100 permits the initial charging of container 101, also shown in FIG. 1, with fluid from a fluid source (not shown) that may be introduced into container 101 via, for example, passageway (port) 102 through nozzle 103.

Passageway 102 is shown in FIG. 1 to be in fluid communication with the interior portion of container 101 via central bore 104 in valve housing 105. The arrow depicted in container 101 indicates that the direction of fluid flow in FIG. 1 is into container 101.

Figure 10:
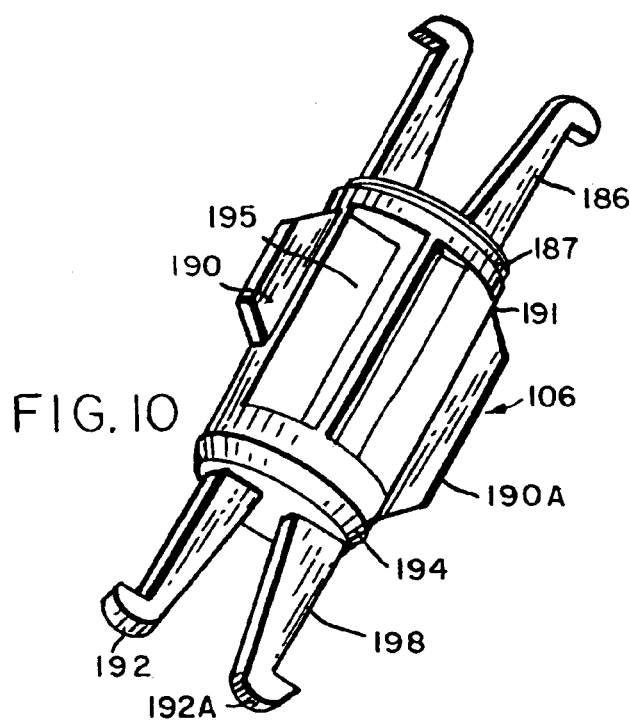
FIG. 10 is a perspective view of a check useful in accord with one embodiment of the present invention, which may be used in a non-refillable valve of the type depicted in FIGS. 1–4 (the check in FIG. 10 is the same type of check depicted in FIGS. 1–4).

That a fluid path actually exists between passageway 102 and the interior of container 101, will become apparent to those skilled in the art after studying the perspective drawing of illustrative blocking element 106 shown in FIG. 10 depicting the same check shown in FIG. 1. In particular, with reference to FIG. 10, it may be seen that, for example, vanes 190 and 190α (formed as part of check body 191 and used to center blocking element 106 when installed in valve housing 105 as is explained further hereinafter); together with the recesses (like recess 195) in check body 191, form a passageway in valve housing 105 through which fluid can flow between central core 104 and the interior of container 101. This passageway is open so long as check 106 (in particular sealing portion 194 on the end of check 106 assumed, for the sake of illustration only, to be inserted first when installed in valve housing 105) is not seated on seat portions 150 and 150α of housing 105 (shown in FIG. 4 and described in detail hereinafter).

In fact, blocking element 106 is designed to allow container 101 to be filled prior to the one way feature of valve 100 being activated; prevent refilling thereafter; and, as shown, incorporates the reversible, preferably symmetrical, freestanding (when inserted in valve housing 105) and deformable stop features, all discussed hereinbefore. All of these features will become apparent from the detailed description of the invention that follows when read in conjunction with the Drawing.

Central bore 104 in valve housing 105 has three distinct portions depicted in each of FIGS. 1–4: upper bore portion 120, middle bore portion 121 and lower bore portion 122. In accord with a preferred embodiment of the invention, valve housing 105 is a unidirectional stepped valve housing as previously defined (i.e., a valve housing that includes a central bore having two or more stepped portions each radially increasing (or conversely decreasing) as the bore is traversed in a given direction).

Traversing the valve from top to bottom, the radius of the bore in the upper valve portion 120 can be seen to be greater than the radius in middle valve portion 121; and the radius in middle valve portion 121 can in be seen to be greater than the radius in lower valve portion 122. This design, for the reasons explained hereinbefore, is advantageous for valve manufacturing purposes.

Figure 2:
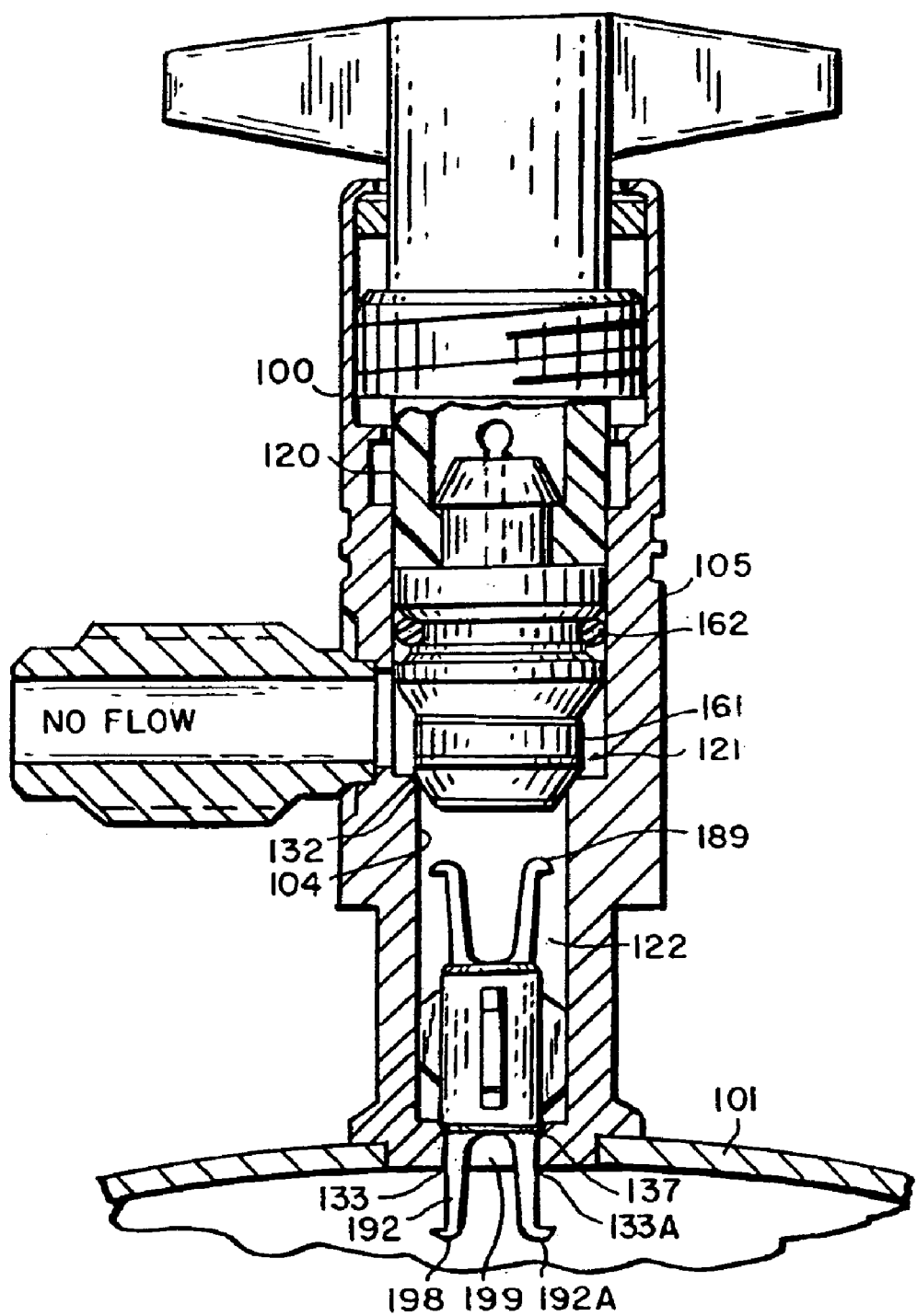
FIG. 2 is an elevation view, partially in cross-section, of the non-refillable valve shown in FIG. 1 in its closed position, ready for use.

FIG. 2 depicts the valve 100 in its closed position, ready for use after container 101 is initially charged with fluid and closed for the first time. No fluid is flowing when valve 100 is in the closed position shown in FIG. 2.

Figure 3:
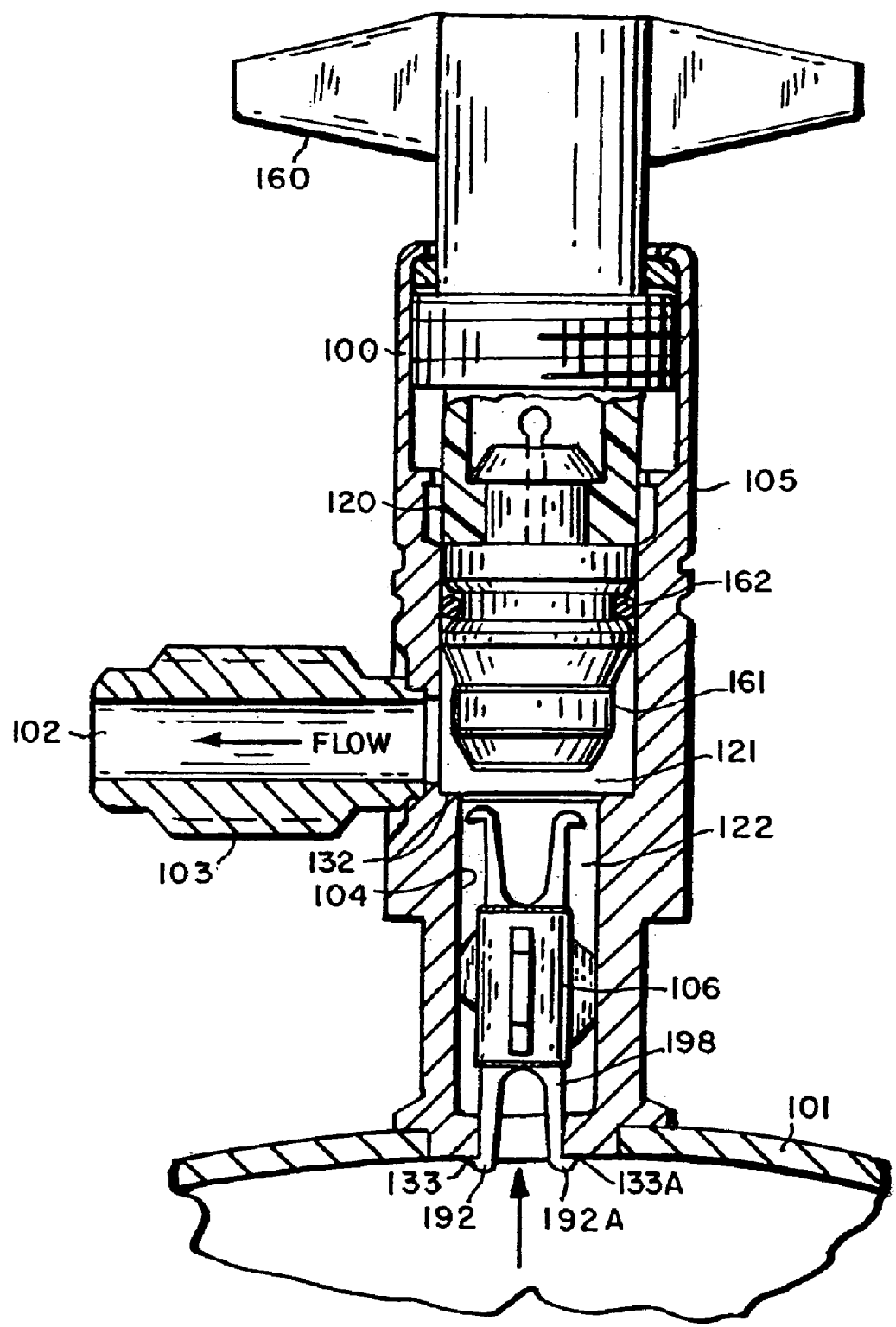
FIG. 3 is an elevation view, partially in cross-section, of the non-refillable valve shown in FIG. 1 in an open position that facilitates discharge of the contents of the container to which the valve is attached.

FIG. 3 depicts the valve 100 in an open position. The arrow depicted in container 101 indicates that the direction of fluid flow in FIG. 3 is out of container 101, into central bore 104 in valve housing 105, and eventually out of passage way 102 through nozzle 103.

Figure 4:
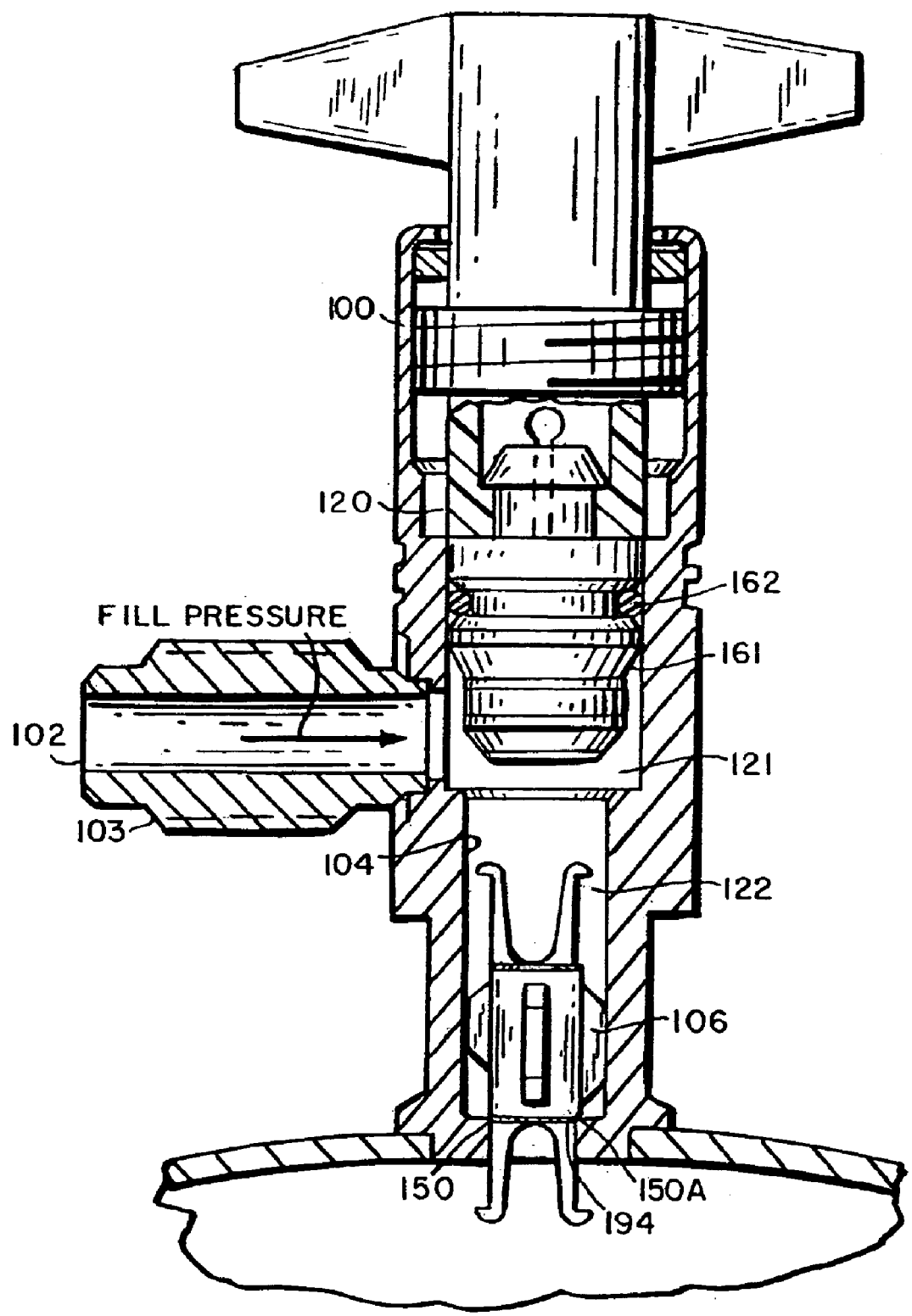
FIG. 4 is an elevation view, partially in cross-section, of the non-refillable valve shown in FIG. 1 in the position assumed by such valve when a refill is attempted at any time after the authorized initial charging of the container.

FIG. 4 depicts the valve 100 in a "non-refill" position, i.e., a position in which blocking element (check) 106 makes contact with the seat (shown at 150 and 150α in FIG. 4) in the lower portion of central bore 104 to thereby prevent fluid from flowing into container 101. No fluid is flowing through valve 100 into container 101 even when a fluid source is connected to passageway 102 of nozzle 103 as is indicated on FIG. 4.

This illustrates the one way feature of valve 100 at work, i.e., when valve 100 is in the non-refill position depicted in FIG. 4.

Non-refillable valve 100, as illustrated in FIGS. 1–4, is attached to a cylinder, like exemplary container 101, expressly intended for a one fill opportunity. The attachment is typically performed by welding valve housing 105 to container 101 in the area marked 130 and 130α in FIG. 1 during a valve manufacturing process, such as the valve manufacturing process contemplated by that aspect of the invention described hereinafter with reference to FIG. 13.

The valve 100 and container 101 combination depicted in FIG. 1 is typically shipped to an authorized filler in the fill position illustrated in FIG. 1. When closed for the first time, the non-refillable feature is activated. The end user will only be able to discharge the cylinder contents with no refill opportunity being possible.

Exemplary non-refillable valve 100 as shown in FIG. 1 has the following main components: t-stem 160 (illustrative means for controlling the opening and closing of valve 100); valve seat 161 (illustrative means for making the primary valve seal) which, for the reasons stated hereinbefore, preferably is fabricated separately with respect to t-stem 160 (and optionally from a different material if desirable); blocking element (check) 106, which preferably has all (or at least some) of the desirable check attributes discussed hereinbefore (such as being reversible, preferably symmetrical, free-standing when inserted into valve 100, etc.); unidirectional stepped valve housing 105 which encloses all valve components and, as indicated hereinabove, is attached to container 101; sealing means (such as o-ring seal 162); and nozzle (or port) 103 for filling and using the container, all depicted in FIG. 1.

The t-stem 160 is used to control the opening and closing of the non-refillable valve.

Valve seat 161, as illustrated in FIGS. 1–4, is designed to make the primary valve seal when valve 100 is closed. In accord with the present invention, as shown in more detail in FIGS. 5–9, the valve seat 161 is designed to form a locking engagement with t-stem 160 when the two components are assembled. As such, the t-stem 160 has an internal opening 555 having the same shape as the top portion of the valve seat, and a slot or key-way 560 (which terminates in a circular opening 171 transverse to the longitudinal axis of the t-stem) separating two lower legs 550, 551 that allows the legs to bend outwardly to insert the valve seat.

Valve seat 161 has an upper portion 180 that fits into and engages with the corresponding opening 555 in t-stem 160 and a lower portion that forms the primary valve seal in the valve housing. The upper portion 180 also provides a land or shoulder area abutting legs 550, 551 of the t-stem. A cylindrical hole 565 is provided in the valve seat which allows the top of the valve seat to be pushed together for insertion into the key-way of t-stem 160. When the top of the valve seat is inserted into and engaged with the t-stem, the legs 550, 551 of the t-stem separate and then return to their original shape like a spring to lock the valve seat in the t-stem. The valve seat also may have one or more slots extending outwardly from the hole 565 in the valve seat to facilitate insertion into the t-stem. The particular configuration will take into account the resilience of the materials used for the components. The hole 565 also can have an alternative cross sectional shape.

Figure 14:
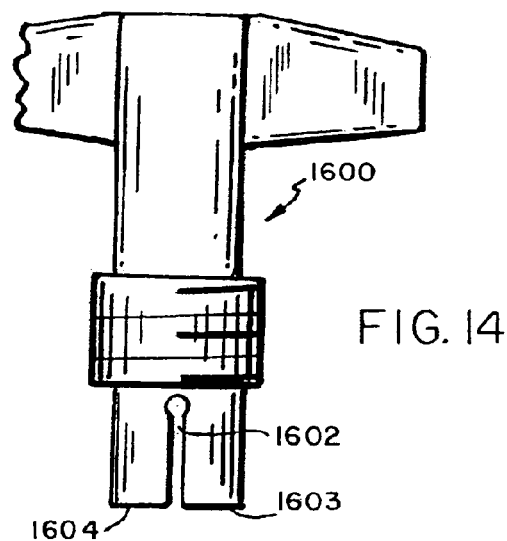
FIG. 14 is an elevation view of the embodiment of a t-stem useful for valves as illustrated in FIG. 1.
Figure 15:
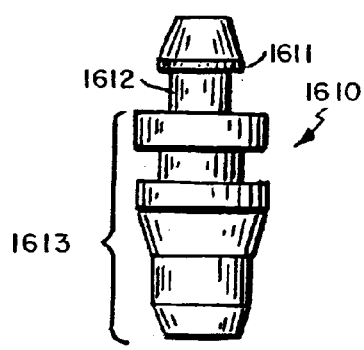
FIG. 15 is an elevation view of an alternative embodiment of a valve seat useful for valves of the present invention.
Figure 16:
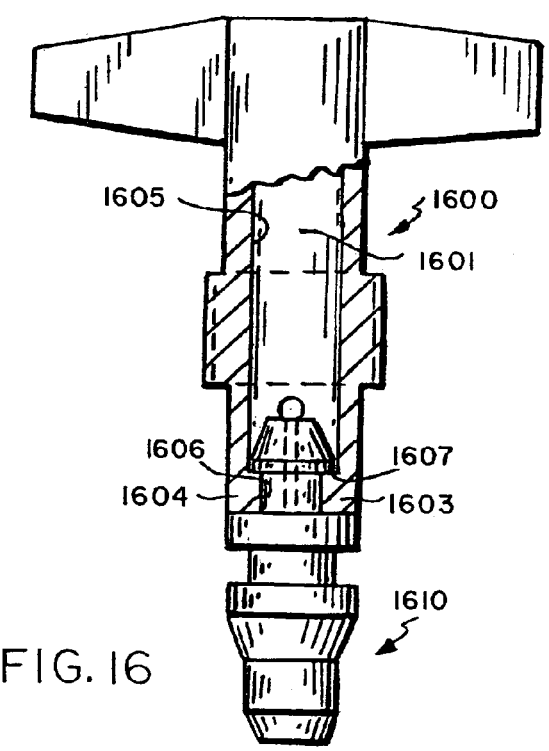
FIG. 16 is an elevation view, partly in cross-section, showing the assembly of the t-stem of FIG. 14 and the valve seat of FIG. 15.

An alternative embodiment of the valve seat is illustrated in FIG. 15 and the t-stem is further illustrated in FIGS. 14 and 16. As in the embodiment described above, t-stem 1600 and valve seat 1610 have coordinating structure so that the t-stem engages and holds valve seat 1610. The t-stem 1600 has an internal bore 1601 extending through the t-stem. A slot or key-way 1602 is provided to form two lower legs 1603, 1604 and allows the legs to bend outwardly to insert the valve seat 1610 into the t-stem. The upper portion 1605 of the internal bore 1601 has a diameter slightly larger than the diameter of the upper portion 1611 of the valve seat 1610. The lower portion 1606 of the bore 1601 has a diameter smaller than the upper diameter but large enough to accept the cylindrical connector portion 1612 of the valve seat, which connects the upper portion 1611 and the lower portion 1613 of the valve seat. The difference in the diameters of the upper portion 1605 and the lower portion 1606 of the bore 1601 forms a ledge 1607 which engages the upper portion 1611 of the valve seat 1610 and locks it into the t-stem 1600. The upper portion 1611 of the valve seat 1610 engages with the corresponding structure (i.e., ledge 1607) of the t-stem 1600 and a lower portion 1613 forms the primary valve seal.

Although the valve seat engages the t-stem to form a locked assembly, the valve seat is capable of rotating relative to the t-stem, so that when the t-stem is turned to position the valve seat for sealing, when there is no back pressure on the it, the valve seat does not rotate in the central bore due to friction between the valve seat and the o-ring sealing the valve housing. Thus, while the t-stem is turned to position the valve seat without back pressure, the valve seat translates linearly only along the central axis without rotational motion.

Those skilled in the art will readily appreciate that alternative upper and lower valve seat shapes can be employed for the same purpose (making the primary valve seal and engaging the t-stem, respectively) depending on the location of nozzle 103 and the interface between the passageway therethrough and central bore 104, etc. The depicted shape of the valve seat is not intended to limit the scope of the invention, but rather to illustrate a suitable valve seat shape for effecting the primary valve seal for the lower portion of the exemplary valve 100 being described with reference to FIGS. 1–4 and effecting a locking engagement with the t-stem 160 as illustrated in FIGS. 5–6 and 16. Thus, the geometries of the valve seat and the t-stem are designed to cooperate to provide a locking arrangement when the valve is opened.

Valve seats 161, 1610 also make the stem seal when the valve is open. For example (and for the sake of illustration only), o-ring 162 is shown held in place by valve seats 161, 1610 and is used to effect the stem seal as depicted in each of FIGS. 1–4 (where o-ring seal 162 is shown held by valve seat 161 against the interior surface of middle portion 121 of central bore 104).

In the embodiment of the invention illustrated in FIG. 1, all valve components are held inside valve housing 105 by a permanent swage to the end of valve housing 105 (shown at 165 in FIG. 1). The valve is opened and closed by rotating the handle of t-stem 160 shown at 166 in FIG. 1. As illustrate, t-stem 160 rotation is translated to an axial motion within the valve housing 105 via screw threads 170.

Furthermore, according to one embodiment of the invention, valve seat 161 and t-stem 160 are attached by snap-fit engagement illustrated in FIGS. 5–6 (or alternatively, for example, by the engagement illustrated in FIG. 16). This attachment (as well as others that may be devised by those skilled in the art) provides a mechanical means to open the valve, as opposed to pressure differential alone. Snap-fit coupling of the valve seat and t-stem is accomplished by corresponding locking geometries of the upper portion of the valve seat and the internal opening of the t-stem. Other geometries for accomplishing the desired result can be readily designed by those skilled practitioners of the art.

It should be noted that the aforementioned attachment is intended to provide friction between t-stem 160 and valve seat 161 that is less than friction between o-ring seal 162 and valve housing 105. Initially, prior to filling a container, this can prevent rotation of the valve seat 161 in central bore 104.

As those skilled in the art will readily appreciate, limiting rotation of the o-ring seal can extend the resealing capability of valve 100 and improve the sealing performance of the aforementioned stem seal. However, it should be noted that internal pressure (back pressure from the container after filling) may cause the seal to rotate.

It can be seen (FIG. 1) that, when container 101 is being filled through a passageway (port) 102, blocking element or check 106 is located in the lower portion of central bore 104. The illustrative symmetrical check depicted (check 106), allows for its insertion in either direction to simplify assembly (i.e., the check is reversible; although the invention does not require that the check be symmetrical or even reversible in alternative embodiments); the check is freestanding (as defined hereinbefore); and the check is further shown to include deformable member 198 (sometimes referred to herein as a stop means that includes at least one deformable member). Deformable member (or stop) 198 is, according to a preferred embodiment of the invention, intentionally designed to resist the pressures generated during the filling of container 101, pressures exerted when assembling the valve (when positioning valve seat 161 in proximity to check 106 as shown in FIG. 1) and pressures exerted when attempting to force (or drive) check 106 at least in part through opening 199 into container 101 to activate the non-refillable feature of the invention. This intentional rigidity is designed into deformable member 198 so that it does not break or prematurely deform when experiencing the aforementioned pressures.

It should be noted that vanes functioning as described hereinbefore (formed as a part of check 106 and designed to keep the check centered in valve housing 105, allow for fluid passage, etc., refer to vanes 190 and 190a (see FIG. 10 and also FIG. 1).

FIG. 2 illustrates valve 100 in its closed position and ready for use. During initial closure of valve 100, valve seat 161 (placed prior to initial closure in proximity to with check 106 as indicated hereinabove) is intended to make contact with the upper portion of check 106 (shown in FIG. 2 as check portion 189), with the further aforementioned intention of driving the depicted deformable member 198 (with portions thereof shown at 192 and 192a in FIG. 2), at least in part, past stop seat 137 in valve housing 105 (shown in both FIG. 1 and FIG. 2), and through opening 199 into container 101. This will enable the non-refillable feature of the valve as should now be apparent to those skilled in the art.

It can be seen that the primary valve seal is made by contact between valve seat 161 and valve housing 105 at contact location 132 indicated in FIG. 2; and that portions of deformable member 198 (shown as portions 192 and 192α in FIG. 2), are shown designed to engage valve housing 105 at locations 133 and 133a, respectively, when check 106 experiences back pressure from the fluid in container 101. This situation occurs when valve 100 is opened as shown in FIG. 3, with FIG. 3 actually depicting portions 192 and 192α of deformable member 198 engaging valve housing 105 at locations 133 and 133a, respectively, when valve 100 is open.

FIG. 3 depicts non-refillable valve 100 in an open position that facilitates discharge of the contents of the container to which the valve is attached. Removing contents of container 101 is accomplished by rotating t-stem 160 (for example, counter-clockwise if screw threads 170 are formed appropriately in valve housing 105); which breaks the contact between valve seat 161 and valve housing 105 at previously indicated contact location 132. When this occurs (i.e., when the primary valve seal is opened), check 106 floats with the flow of the contents from container 101, allowing the contents of container 101 to be discharged through nozzle 103 and passageway 102, with check 106 engaging valve body 105 as described previously with reference to FIG. 3.

FIG. 4 depicts valve 100 in the position assumed by such valve when a refill is attempted at any time after the authorized initial charging of container 101. Any attempt to refill the container 101 is prevented by the aforementioned seal portion 194 of check 106 (see also FIG. 10) making contact with the seat (shown at 150 and 150α in FIG. 4) in the lower portion of central bore 104.

Figure 11:
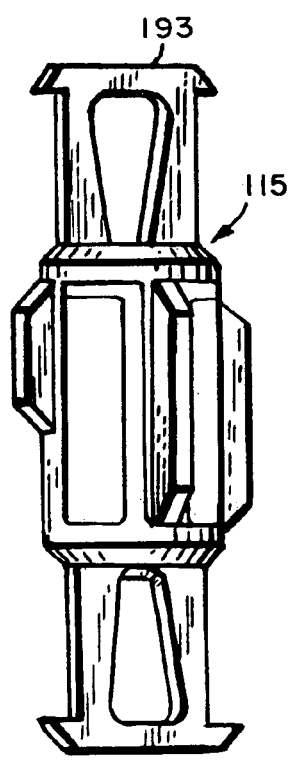
FIG. 11 is a perspective view of a check of useful in accord with an alternative embodiment of the present invention, featuring the use of a "cross bar" stabilizer to enhance check rigidity, the check's ability to function as a freestanding element once inserted into a valve housing and enhance the false engagement protection feature of the depicted check.
Figure 12:
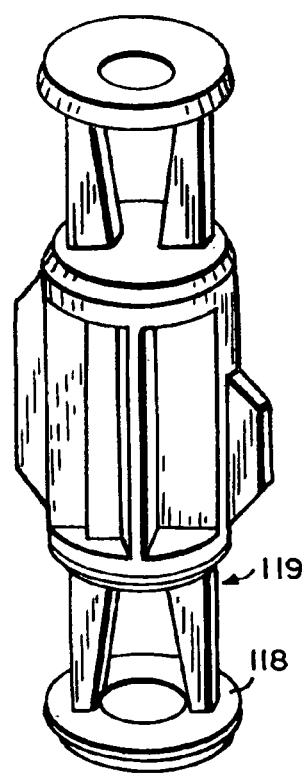
FIG. 12 is a perspective view of a check in accord with yet another alternative embodiment of the present invention, featuring the use of an "annular ring" stabilizer to enhance check rigidity, the check's ability to function as a freestanding element once inserted into a valve housing and enhance the false engagement protection feature of the depicted check.

FIGS. 10–12 illustrates check 106 (as shown in FIG. 5) and alternative embodiments of checks for use with the novel non-refillable valve design set forth herein. Further alternative embodiments effective in the valve can be designed by ordinarily skilled practitioners.

A preferred check 106 is shown in FIG. 10 to include vanes 190 and 190a, and recesses like recess 195, both formed in check body 191 as previously described, for centering check 106 and providing passages for fluid flow when flow is appropriate. As illustrated, deformable member 198 has portions 192 and 192a and check 106 is both reversible and symmetrical. It should be noted that deformable member 198, shown as a radially extending deformable member (actually a radially extending pair of arms is shown in FIG. 10), is identical to deformable member 186 at the top of FIG. 10; and that sealing portion 194 of check 106 is identical to sealing portion 187 of check 106.

Deformable member 198 (and corresponding deformable member 186 shown in FIG. 10) preferably is designed to resist the pressures generated during the filling of container 101, pressures exerted when assembling the valve (when positioning valve seat 161 in proximity to check 106 as shown in FIG. 1) and pressures exerted when attempting to force (or drive) check 106 at least in part through opening 199 into container 101 to activate the non-refillable feature of the invention. This intentional rigidity is designed into, for example, deformable member 198, so that it does not break when experiencing the aforementioned pressures; and so that the check inherently posses a sufficient amount of structural rigidity to function properly as a freestanding element (for example, it doesn't flex to easily and collapse so as to be prematurely forced into the above described check engagement position, etc.).

FIG. 11 illustrates an alternative check 115 useful in the present invention. In this embodiment, "cross bar" stabilizer shown, for example, at 193 is used further to enhance the rigidity of check 115, its check's ability to function as a freestanding element once inserted into a valve housing and to enhance the false engagement protection feature of check 115.

One or more of such stabilizers could be employed to provide any desired degree of rigidity and false engagement protection. Those skilled in the art will readily appreciate that by judicious choice of different materials from which the check is fabricated (plastics, elastomers, etc.), and by varying deformable member dimensions, etc., different degrees of rigidity, etc., can be attained.

FIG. 12 illustrates yet another alternative check 119 that uses an "annular ring" stabilizer shown, for example, at 118 also provided to enhance the rigidity, freestanding functionality and false engagement protection characteristics of the check.

As with check 118 shown in FIG. 11, check 119 shown in FIG. 12 can employ other stabilizing elements (like a cross bar across the diameter of each annular ring), a variety of material choices, etc., to create a check design to meet any of a wide range of application needs.

Figure 13:
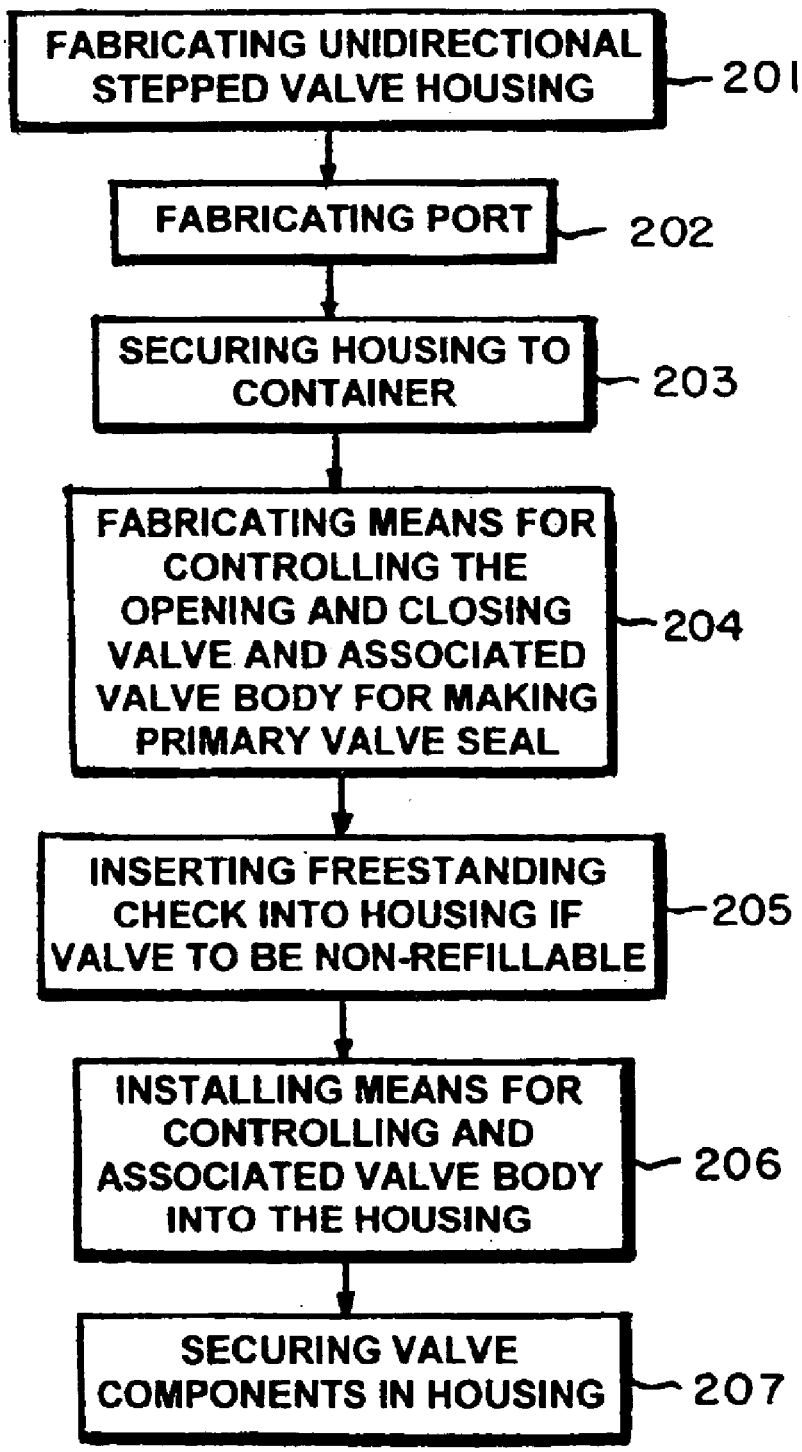
FIG. 13 illustrates a manufacturing process for making valves of the present invention.

FIG. 13 illustrates a dual purpose manufacturing process suitable for use in manufacturing both refillable and non-refillable valves from essentially the same valve design, parts and process steps. Accordingly, the steps for making both refillable and non-refillable valves are exactly the same; with the exception that no blocking element is installed in the refillable valve.

First step 201 involves fabricating a unidirectional stepped valve housing as describe hereinbefore. A preferred housing includes a central bore that further includes an upper portion, lower portion and a middle portion located therebetween. The lower portion is narrower than the middle portion which in turn is narrower than the upper portion. Such a housing was depicted and described with reference to FIGS. 1–4 herein and can be used in manufacturing both refillable and non-refillable valves.

The valve housing can be fabricated using ferrous metal, non-ferrous metal, plastics, ceramics, etc. In one particularly useful application for the invention, cold finished 1215 steel is used to fabricate the valve housing.

In process step 202, a port is provided in the middle portion of the unidirectional stepped valve housing to facilitate connection of a nozzle thereto.

Step 203 secures the valve housing to the container such that the lower portion of the central bore is in fluid communication with the interior of the container.

Then. in step 204, means are provided for controlling the opening and closing of the valve and an associated valve seat component for making a primary valve seal when the valve is closed. The t-stem 160/valve seat 161 combination are assembled together to provide a locked unit.

Step 204 can be performed using any one of a wide variety of materials for the t-stem and the valve seat. There is no intent to limit the practice of the manufacturing aspects of the invention to a process that uses a particular material type for components 160, 161 and whatever mechanism is used to insure their cooperation with one another. However, with this being said, it should be noted that non-ferrous metals, plastics and elastomers are typically used to fabricate valve seats; whereas t-stem arrangements are typically required to be more rigid and are often formed using a metallic or plastic substance. The primary requirements for the materials are having required structural strength and wear properties, and being chemically compatible with the fluids that they contact.

Step 205 involves inserting the blocking element comprising a freestanding check (preferably a check that is reversible, symmetrical, including the previously described deformable member(s) and/or possessing at least some of the other check characteristics called for by other previously described aspects of the instant invention) into the valve housing, whenever the valve is to be used as a non-refillable valve. The inserted blocking element is centered within and rests in the lower portion of the central bore in the valve housing, in proximity to the container. In other words, for example, portions 192 and 192α of deformable member 198 of check 106 (clearly shown in FIG. 10) makes contact with and rests on the seat (shown at 150 and 150α in FIG. 4) in the lower portion of central bore 104.

In step 206, the t-stem and valve seat assembly is installed into the valve housing. As shown in FIGS. 1–4, after performing step 206 the valve seat component should be located within middle portion 121 of the central bore.

Finally, in step 207, all of the components are secured within the valve housing.

As those skilled in the art will readily appreciate, all of the aforementioned steps are identical for making both refillable and non-refillable valve; with the exception of the step that requires the insertion of a blocking element at a relatively late stage in the manufacturing process, if a non-refillable valve is desired. Accordingly, the valve housings, control mechanisms, valve bodies, etc., can all be made in advance and stocked with a blocking element being introduced (if desired) just prior to executing the final assembly steps (steps 206 and 207) of the illustrative process described herein.

It should be remembered that, when performing the aforementioned step 205, installation should be accomplished in a "careful" predetermined manner so as to avoid driving said blocking element into the container to avoid activating the non-refillable feature of the valve prematurely (for example, carefully choosing the number of turns of the t-stem/valve seat assembly required to position the valve seat in proximity to the check after installation, which will of course depend on the size and shapes of the various components used.

The invention has been described in detail including the preferred embodiments. However, it should be appreciated that those skilled in the art may make modifications and variations within the scope of the present invention in light of the above teachings. Therefore, it is understood that the claims appended hereto are intended to cover all such modifications and variations which fall within the true scope and spirit of the invention.

What is claimed is:

1. A valve for a pressurized container, the valve comprising:

a valve housing having a central bore;

a port in said housing to facilitate connection of a nozzle thereto;

a t-stem having a longitudinal axis and an outer surface with a lower end with a key-way, the lower end further having in conjunction with the key-way a cavity of a predetermined shape; and a valve seat providing the primary valve seal when the valve is closed, wherein the valve seat has an upper portion and a lower portion, the lower portion being structured and arranged to provide the primary valve seal in cooperation with the valve housing, the upper portion having a geometry for engaging with the t-stem to provide a locked assembly;

the t-stem and valve seat being located in the housing and cooperating to position the valve seat for the primary valve seal;

the key-way comprising a slot in the outer surface to the cavity, the slot terminating with an opening transverse to the longitudinal axis.

2. The valve of claim 1, wherein the t-stem has an internal bore extending lengthwise therein, the internal bore having upper portion with a first diameter and a lower portion with a second diameter, the first diameter being larger than the second diameter thereby forming an internal edge within the bore for cooperating with the valve seat to lock the valve seat in the t-stem when positioned within the valve housing.

3. A valve for a pressurized container, the valve comprising:

a unidirectional stepped valve housing, wherein said housing comprises a central bore that includes an upper portion, lower portion and a middle portion located therebetween, wherein said lower portion is narrower than said middle portion which in turn is narrower than said upper portion;

a port in the middle portion of said housing to facilitate connection of a nozzle thereto;

a t-stem having a longitudinal axis and an outer surface with a lower end with a key-way, the lower end further having in conjunction with the key-way a cavity of a predetermined shape; and a valve seat providing the primary valve seal when the valve is closed, wherein the valve seat has an upper portion and a lower portion, the lower portion being structured and arranged to provide the primary valve seal in cooperation with the valve housing, the upper portion having a geometry for engaging with the t-stem to provide a locked assembly;

the t-stem and valve seat being located in the housing and cooperating to position the valve seat for the primary valve seal;

the key-way comprising a slot in the outer surface to the cavity, the slot terminating with an opening transverse to the longitudinal axis.

4. The valve of claim 3, further comprising a blocking element in the lower portion of said central bore.

5. The valve of claim 4, wherein the blocking element is structured and arranged to be free standing in the lower portion of the central bore, to be irreversibly moved to a final location in the valve wherein the valve permits escape of a fluid under pressure exerted from the inside of the container, but wherein the blocking element automatically closes the valve in response to an external pressure greater than the pressure inside the container.

6. The valve of claim 4, wherein the blocking element comprises a reversible check that integrally includes a stop means for preventing the return of the blocking element to a free standing position in the lower portion of the central bore after the check has been moved into a final location after filling of the container.

7. The valve of claim 3, further comprising an o-ring to provide a secondary seal between the valve seat and the valve housing when the valve is in an open position.

8. The valve of claim 7, wherein there is a first frictional force exerted by the o-ring between the valve seat and the valve housing, the first frictional force limiting rotation of the valve seat in the valve body when the valve is closed or opened.

9. The valve of claim 7, wherein there is a first frictional force exerted by the o-ring between the valve seat and the valve housing, the first frictional force preventing rotation of the valve seat in the valve body when the valve is closed or opened without back pressure on the valve seat.

10. The valve of claim 3, wherein the t-stem has an internal bore extending lengthwise therein, the internal bore having upper portion with a first diameter and a lower portion with a second diameter, the first diameter being larger than the second diameter thereby forming an internal edge within the bore for engaging with the valve seat to lock the valve seat in the t-stem when positioned within the valve housing.

11. A container with a valve preventing refilling, the valve comprising:

a valve housing having a central bore;

a blocking element in the housing to prevent refilling of the container;

a port in said housing to facilitate connection of a nozzle thereto;

a t-stem having a longitudinal axis and an outer surface with a lower end with a key-way, the lower end further having in conjunction with the key-way a cavity of a predetermined shape; and a valve seat providing the primary valve seal when the valve is closed, wherein the valve seat has an upper portion and a lower portion, the lower portion being structured and arranged to provide the primary valve seal in cooperation with the valve housing, the upper portion having a geometry for engaging with the t-stem to provide a locked assembly;

the t-stem and valve seat being located in the housing and cooperating to position the valve seat for the primary valve seal;

the key-way comprising a slot in the outer surface to the cavity, the slot terminating with an opening transverse to the longitudinal axis.

12. A container with a valve preventing refilling, the valve comprising:

a unidirectional stepped valve housing, wherein said housing comprises a central bore that includes an upper portion, lower portion and a middle portion located therebetween, wherein said lower portion is narrower than said middle portion which in turn is narrower than said upper portion;

a blocking element in the lower portion of said central bore;

a port in the middle portion of said housing to facilitate connection of a nozzle thereto;

a t-stem having a longitudinal axis and an outer surface with a lower end with a key-way, the lower end further having in conjunction with the key-way a cavity of a predetermined shape; and a valve seat providing the primary valve seal when the valve is closed, wherein the valve seat has an upper portion and a lower portion, the lower portion being structured and arranged to provide the primary valve seal in cooperation with the valve housing, the upper portion having a geometry for cooperating with the t-stem to provide a locked assembly;

the t-stem and valve seat being located in the housing and cooperating to position the valve seat for the primary valve seal;

the key-way comprising a slot in the outer surface to the cavity, the slot terminating with an opening transverse to the longitudinal axis.

13. The container of claim 12, wherein the valve further comprises an o-ring to provide a secondary seal between the valve seat and the valve housing when the valve is in an open position.

14. The container of claim 13, wherein there is a first frictional force exerted by the o-ring between the valve seat and the valve housing, the first frictional force limiting rotation of the valve seat in the valve body when the valve is closed or opened.

15. The container of claim 13, wherein there is a first frictional force exerted by the o-ring between the valve seat and the valve housing, the first frictional force preventing rotation of the valve seat in the valve body when the valve is closed or opened without back pressure from the container on the valve seat.

16. The container of claim 12, wherein the t-stem has an internal bore extending lengthwise therein, the internal bore having upper portion with a first diameter and a lower portion with a second diameter, the first diameter being larger than the second diameter thereby forming an internal edge within the bore for engaging with the valve seat to lock the valve seat in the t-stem when positioned within the valve housing.

17. The container of claim 12, wherein the blocking element is structured and arranged to be free standing in the lower portion of the central bore, to be irreversibly moved to a final location in the valve wherein the valve permits escape of a fluid under pressure exerted from the inside of the container, but wherein the blocking element automatically closes the valve in response to an external pressure greater than the pressure inside the container.

18. The container of claim 12, wherein the blocking element comprises a reversible check that integrally includes a stop means for preventing the return of the blocking element to a free standing position in the lower portion of the central bore after the check has been moved into a final location after filling of the container.

19. A method for filling a non-refillable container with a pressurized fluid, the method comprising:

providing the container with a valve comprising:
- a valve housing having a central bore;
- a blocking element in the housing to prevent refilling of the container;
- a port in said housing to facilitate connection of a nozzle thereto;
- a t-stem having a longitudinal axis and an outer surface with a lower end with a key-way, the lower end further having in conjunction with the key-way a cavity of a predetermined shape; and
- a valve seat providing the primary valve seal when the valve is closed, wherein the valve seat has an upper portion and a lower portion, the lower portion being structured and arranged to provide the primary valve seal in cooperation with the valve housing, the upper portion having a geometry for engaging with the t-stem to provide a locked assembly;
- the t-stem and valve seat being located in the housing and cooperating to position the valve seat for the primary valve seal;
- the key-way comprising a slot in the outer surface to the cavity, the slot terminating with an opening transverse to the longitudinal axis;

filling the container with the fluid;

closing the valve by moving the valve seat to form the primary seal, thereby causing the blocking element to move into a second position whereby, when the valve is opened, fluid can flow out of the container under pressure however, when pressure outside the container is greater, the blocking element prevents flow into the container, thereby providing a non-refillable container.

20. A method for filling a non-refillable container with a pressurized fluid, the method comprising:

providing the container with a valve comprising:
- a unidirectional stepped valve housing, wherein said housing comprises a central bore that includes an upper portion, lower portion and a middle portion located therebetween, wherein said lower portion is narrower than said middle portion which in turn is narrower than said upper portion;
- a blocking element in a first position in the lower portion of said central bore;
- a port in the middle portion of said housing to facilitate connection of a nozzle thereto;
- a t-stem having a longitudinal axis and an outer surface with a lower end with a key-way, the lower end further having in conjunction with the key-way a cavity of a predetermined shape; and
- a valve seat providing the primary valve seal when the valve is closed, wherein the valve seat has an upper portion and a lower portion, the lower portion being structured and arranged to provide the primary valve seal in cooperation with the valve housing, the upper portion having a geometry for engaging with the t-stem to provide a locked assembly;
- the t-stem and valve seat being located in the housing and cooperating to position the valve seat for the primary valve seal;
- the key-way comprising a slot in the outer surface to the cavity, the slot terminating with an opening transverse to the longitudinal axis;

filling the container with the fluid;

closing the valve by moving the valve seat to form the primary seal, thereby causing the blocking element to move into a second position whereby, when the valve is opened, fluid can flow out of the container under pressure however, when pressure outside the container is greater, the blocking element prevents flow into the container, thereby providing a non-refillable container.

* * * * *